(12) United States Patent
Kawakami et al.

(10) Patent No.: US 9,601,764 B2
(45) Date of Patent: *Mar. 21, 2017

(54) POWER STORAGE DEVICE

(71) Applicant: SEMICONDUCTOR ENERGY LABORATORY CO., LTD., Atsugi-shi, Kanagawa-ken (JP)

(72) Inventors: Takahiro Kawakami, Kanagawa (JP); Hiroatsu Todoriki, Kanagawa (JP); Teppei Oguni, Kanagwa (JP); Takeshi Osada, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 152 days.

This patent is subject to a terminal disclaimer.

(21) Appl. No.: 14/604,979

(22) Filed: Jan. 26, 2015

(65) Prior Publication Data

US 2015/0140429 A1 May 21, 2015

Related U.S. Application Data

(63) Continuation of application No. 13/644,263, filed on Oct. 4, 2012, now Pat. No. 8,945,772.

(30) Foreign Application Priority Data

Oct. 7, 2011 (JP) ................................. 2011-223327

(51) Int. Cl.
*H01M 4/525* (2010.01)
*H01M 4/52* (2010.01)
(Continued)

(52) U.S. Cl.
CPC .......... *H01M 4/366* (2013.01); *H01M 4/131* (2013.01); *H01M 4/483* (2013.01); *H01M 4/505* (2013.01);
(Continued)

(58) Field of Classification Search
None
See application file for complete search history.

(56) References Cited

U.S. PATENT DOCUMENTS 4,302,518 A    11/1981    Goodenough et al.
4,668,595 A    5/1987    Yoshino et al.
(Continued)

FOREIGN PATENT DOCUMENTS

CN    101423209 A    5/2009
CN    101710619 A    5/2010
(Continued)

OTHER PUBLICATIONS

Ju.Jeong-Hun et al., "Electrochemical performance of Li[Co0.1Ni0.15Li0.2Mn0.55]O2 modified by carbons as cathode materials", Electrochimica Acta, 2011, vol. 56, pp. 8791-8796.
(Continued)

*Primary Examiner* — Patrick Ryan
*Assistant Examiner* — Christopher Domone
(74) *Attorney, Agent, or Firm* — Nixon Peabody LLP; Jeffrey L. Costellia

(57) ABSTRACT

A power storage device a positive electrode including a positive electrode active material layer and a negative electrode including a negative electrode active material layer. The positive electrode active material layer includes a plurality of particles of $x[Li_2MnO_3]-(1-x)[LiCo_{1/3}Mn_{1/3}Ni_{1/3}O_2]$ (obtained by assigning 0.5 to x, for example) which is a positive electrode active material, and multilayer graphene with which the plurality of particles of the positive electrode active material are at least partly connected to each other. In the multilayer graphene, a plurality of graphenes are stacked in a layered manner. The graphene contains a six-membered ring composed of carbon atoms, a poly-membered ring which is a seven or more-membered ring
(Continued)

composed of carbon atoms, and an oxygen atom bonded to one or more of the carbon atoms in the six-membered ring and the poly-membered ring, which is a seven or more-membered ring.

20 Claims, 5 Drawing Sheets

(51) Int. Cl.
  H01M 4/62      (2006.01)
  H01M 4/505     (2010.01)
  H01M 4/36      (2006.01)
  H01M 4/131     (2010.01)
  H01M 4/48      (2010.01)
  H01M 10/0525   (2010.01)

(52) U.S. Cl.
  CPC .......... *H01M 4/523* (2013.01); *H01M 4/525* (2013.01); *H01M 4/625* (2013.01); *H01M 10/0525* (2013.01); *Y02E 60/122* (2013.01)

(56) References Cited

U.S. PATENT DOCUMENTS

| | | |
|---|---|---|
| 5,783,333 A | 7/1998 | Mayer |
| 7,179,561 B2 | 2/2007 | Niu et al. |
| 7,572,542 B2 | 8/2009 | Naoi |
| 7,658,901 B2 | 2/2010 | Prud'Homme et al. |
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 7,988,941 B2 | 8/2011 | Choi et al. |
| 8,003,257 B2 | 8/2011 | Takeuchi et al. |
| 8,278,011 B2 | 10/2012 | Zhu et al. |
| 8,317,984 B2 | 11/2012 | Gilje |
| 8,945,772 B2 * | 2/2015 | Kawakami ............ H01M 4/131 429/223 |
| 9,045,346 B2 | 6/2015 | Nesper et al. |
| 9,187,332 B2 | 11/2015 | Yoon et al. |
| 9,324,994 B2 | 4/2016 | Oh et al. |
| 2001/0010807 A1 | 8/2001 | Matsubara |
| 2002/0195591 A1 | 12/2002 | Ravet et al. |
| 2006/0051671 A1 | 3/2006 | Thackeray et al. |
| 2007/0009799 A1 | 1/2007 | Zheng |
| 2007/0131915 A1 | 6/2007 | Stankovich et al. |
| 2007/0195488 A1 | 8/2007 | Kim et al. |
| 2008/0048153 A1 | 2/2008 | Naoi |
| 2008/0254296 A1 | 10/2008 | Handa et al. |
| 2009/0110627 A1 | 4/2009 | Choi et al. |
| 2009/0117467 A1 | 5/2009 | Zhamu et al. |
| 2009/0123850 A1 | 5/2009 | Takeuchi et al. |
| 2009/0246625 A1 * | 10/2009 | Lu ........................ H01M 4/133 429/207 |
| 2009/0305135 A1 | 12/2009 | Shi et al. |
| 2010/0035093 A1 | 2/2010 | Ruoff et al. |
| 2010/0055025 A1 | 3/2010 | Jang et al. |
| 2010/0078591 A1 | 4/2010 | Sano et al. |
| 2010/0081057 A1 | 4/2010 | Liu et al. |
| 2010/0105834 A1 | 4/2010 | Tour et al. |
| 2010/0143798 A1 | 6/2010 | Zhamu et al. |
| 2010/0176337 A1 | 7/2010 | Zhamu et al. |
| 2010/0233538 A1 | 9/2010 | Nesper et al. |
| 2010/0233546 A1 | 9/2010 | Nesper et al. |
| 2010/0233550 A1 | 9/2010 | Yanagida et al. |
| 2010/0248034 A1 | 9/2010 | Oki et al. |
| 2010/0301279 A1 | 12/2010 | Nesper et al. |
| 2010/0303706 A1 | 12/2010 | Wallace et al. |
| 2010/0308277 A1 | 12/2010 | Grupp |
| 2010/0330421 A1 | 12/2010 | Cui et al. |
| 2011/0012067 A1 | 1/2011 | Kay |
| 2011/0020706 A1 | 1/2011 | Nesper |
| 2011/0070146 A1 | 3/2011 | Song et al. |
| 2011/0111303 A1 | 5/2011 | Kung et al. |
| 2011/0114897 A1 | 5/2011 | Aksay et al. |
| 2011/0121240 A1 | 5/2011 | Amine et al. |
| 2011/0159372 A1 | 6/2011 | Zhamu et al. |
| 2011/0227000 A1 | 9/2011 | Ruoff et al. |
| 2011/0229757 A1 | 9/2011 | Kawakami et al. |
| 2011/0229795 A1 | 9/2011 | Niu et al. |
| 2011/0244210 A1 | 10/2011 | Choi et al. |
| 2011/0269016 A1 | 11/2011 | Takeuchi et al. |
| 2012/0045692 A1 | 2/2012 | Takemura et al. |
| 2012/0058397 A1 | 3/2012 | Zhamu et al. |
| 2012/0064409 A1 | 3/2012 | Zhamu et al. |
| 2012/0088151 A1 | 4/2012 | Yamazaki et al. |
| 2012/0100402 A1 | 4/2012 | Nesper et al. |
| 2012/0276455 A1 | 11/2012 | Nishimura et al. |
| 2012/0308884 A1 | 12/2012 | Oguni et al. |
| 2012/0308891 A1 | 12/2012 | Todoriki et al. |
| 2012/0315550 A1 | 12/2012 | Liu et al. |
| 2012/0328956 A1 | 12/2012 | Oguni et al. |
| 2013/0045156 A1 | 2/2013 | Nomoto et al. |
| 2013/0045418 A1 | 2/2013 | Oguni et al. |
| 2013/0047423 A1 | 2/2013 | Miwa et al. |
| 2013/0084384 A1 | 4/2013 | Yamakaji |
| 2013/0156942 A1 | 6/2013 | Yamakaji et al. |
| 2013/0266859 A1 | 10/2013 | Todoriki et al. |
| 2013/0266869 A1 | 10/2013 | Todoriki et al. |
| 2015/0270548 A1 | 9/2015 | Nesper et al. |

FOREIGN PATENT DOCUMENTS

| | | |
|---|---|---|
| CN | 101841066 A | 9/2010 |
| CN | 102026916 A | 4/2011 |
| EP | 2055673 A | 5/2009 |
| EP | 2256087 A | 12/2010 |
| EP | 2327662 A | 6/2011 |
| EP | 2541654 A | 1/2013 |
| JP | 06-060870 A | 3/1994 |
| JP | 08-037007 A | 2/1996 |
| JP | 11-025983 A | 1/1999 |
| JP | 2000-277146 A | 10/2000 |
| JP | 2003-238131 A | 8/2003 |
| JP | 2006-265751 A | 10/2006 |
| JP | 2007-042620 A | 2/2007 |
| JP | 2009-524567 | 7/2009 |
| JP | 2009-176721 A | 8/2009 |
| JP | 2010-275186 A | 12/2010 |
| JP | 2011-503804 | 1/2011 |
| JP | 2011-029000 A | 2/2011 |
| JP | 2011-029184 A | 2/2011 |
| JP | 2011-048992 A | 3/2011 |
| JP | 2011-076931 A | 4/2011 |
| JP | 2011-517053 | 5/2011 |
| JP | 2011-105569 A | 6/2011 |
| JP | 2013-520782 | 6/2013 |
| WO | WO-2006/062947 | 6/2006 |
| WO | WO-2006/071076 | 7/2006 |
| WO | WO-2007/004728 | 1/2007 |
| WO | WO-2007/061945 | 5/2007 |
| WO | WO-2009/061685 | 5/2009 |
| WO | WO-2009/127901 | 10/2009 |
| WO | WO-2009/134492 | 11/2009 |
| WO | WO-2009/144600 | 12/2009 |
| WO | WO-2011/105832 | 9/2011 |
| WO | WO-2011/141486 | 11/2011 |

OTHER PUBLICATIONS

Chinese Office Action (Application No. 201210370329.8) Dated Dec. 2, 2015.
Kang.B et al., "Battery Materials for Ultrafast Charging and Discharging", Nature, Mar. 12, 2009, vol. 458, No. 7235, pp. 190-193.
Zhou.F et al., "The Li intercalation potential of LiMPO4 and LiMSiO4 olivines with M=Fe, Mn, Co, Ni", Electrochemistry Communications, Nov. 1, 2004, vol. 6, No. 11, pp. 1144-1148.
Blake.P. et al., "Graphene-Based Liquid Crystal Device", Nano Letters, Apr. 30, 2008, vol. 8, No. 6, pp. 1704-1708.

(56) References Cited

OTHER PUBLICATIONS

Zhao.X et al., "In-Plane Vacancy-Enabled High-Power Si-Graphene Composite Electrode for Lithium-Ion Batteries", Advanced Energy Materials, 2011, vol. 1, pp. 1079-1084.

Takamura.T et al., "Identification of Nano-Sized Holes by TEM in the Graphene Layer of Graphite and the High Rate Discharge Capability of Li-Ion Battery Anodes", Electrochemica Acta, 2007, vol. 53, pp. 1055-1061.

Su.F et al., "Flexible and planar graphene conductive additives for lithium-ion batteries", J. Mater. Chem.(Journal of Materials Chemistry), 2010, vol. 20, pp. 9644-9650.

Zhou.X et al., "Graphene modified LiFePO4 cathode materials for high power lithium ion batteries", J. Mater. Chem. (Journal of Materials Chemistry), 2011, vol. 21, pp. 3353-3358.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Dreyer.D et al., "The Chemistry of Graphene Oxide", Chemical Society Reviews, 2010, vol. 39, No. 1, pp. 228-240.

Todoriki.H et al., "High performance lithium ion battery using Graphene Net electrode", 222nd ECS Meeting Abstract, Oct. 7, 2012, p. 1014, ECS.

Sundaram.R et al., "Electrochemical Modification of Graphene", Adv. Mater. (Advanced Materials), Aug. 18, 2008, vol. 20, No. 16, pp. 3050-3053.

Zhou.M et al., "Controlled Synthesis of Large-Area and Patterned Electrochemically Reduced Graphene Oxide Films", Chemistry A European Journal, Jun. 15, 2009, vol. 15, No. 25, pp. 6116-6120.

Zhang.J et al., "Reduction of graphene oxide via L-ascorbic acid", Chemical Communications, 2010, vol. 46, No. 7, pp. 1112-1114.

Paek.S et al., "Enhanced Cyclic Performance and Lithium Storage Capacity of SnO2/Graphene Nanoporous Electrodes with Three-Dimensionally Delaminated Flexible Structure", Nano Letters, 2009, vol. 9, No. 1, pp. 72-75.

Wang.G et al., "Sn/graphene nanocomposite with 3D architecture for enhanced reversible lithium storage in lithium ion batteries", J. Mater. Chem. (Journal of Materials Chemistry), 2009, vol. 19, No. 44, pp. 8378-8384.

Wang.D et al., "Self-Assembled TiO2-Graphene Hybrid Nanostructures for Enhanced Li-Ion Insertion", ACS NANO, 2009, vol. 3, No. 4, pp. 907-914.

Shao.Y et al., "Facile and controllable electrochemical reduction of graphene oxide and its applications", J. Mater. Chem. (Journal of Materials Chemistry), 2010, vol. 20, No. 4, pp. 743-748.

Wang.Z et al., "Direct Electrochemical Reduction of Single-Layer Graphene Oxide and Subsequent Functionalization with Glucose Oxidase", J. Phys. Chem. C (Journal of Physical Chemistry C), 2009, vol. 113, No. 32, pp. 14071-14075.

Park.S et al., "Chemical structures of hydrazine-treated graphene oxide and generation of aromatic nitrogen doping", Nature Communications, Jan. 24, 2012, vol. 3, pp. 638-1-638-8.

Mattevi.C et al., "Evolution of electrical, chemical, and structural properties of transparent and conducting chemically derived graphene thin films", Adv. Funct. Mater. (Advanced Functional Materials), Aug. 24, 2009, vol. 19, No. 16, pp. 2577-2583.

Zhang.H et al., "Vacuum-assisted synthesis of graphene from thermal exfoliation and reduction of graphite oxide", J. Mater. Chem. (Journal of Materials Chemistry), Apr. 14, 2011, vol. 21, No. 14, pp. 5392-5397.

Park.S et al., "Hydrazine-reduction of graphite-and graphene oxide", Carbon, Mar. 15, 2011, vol. 49, No. 9, pp. 3019-3023, Elsevier.

\* cited by examiner

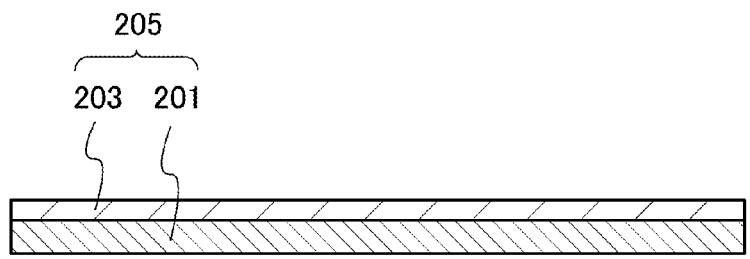
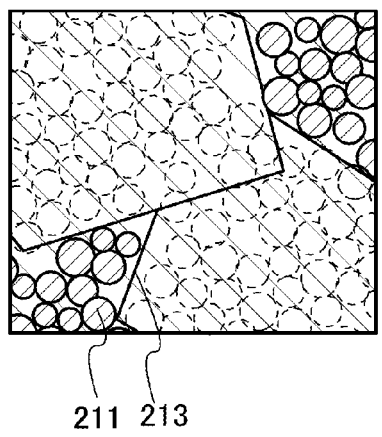
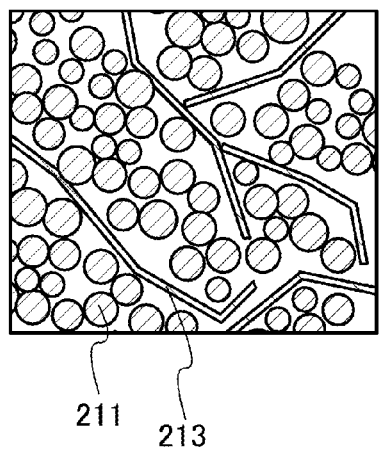
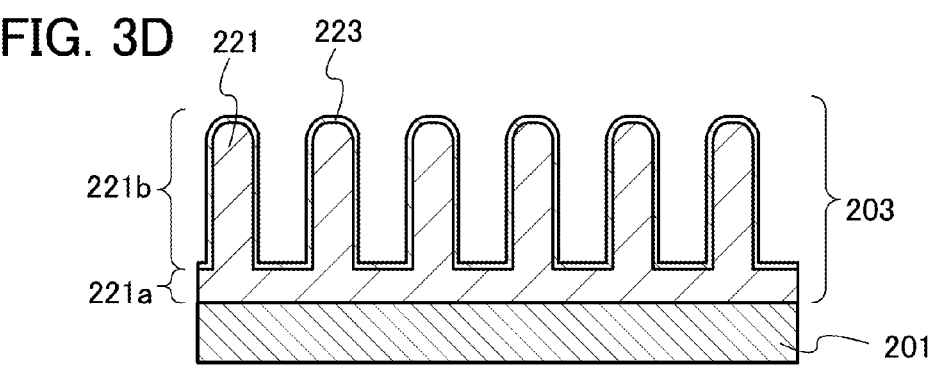
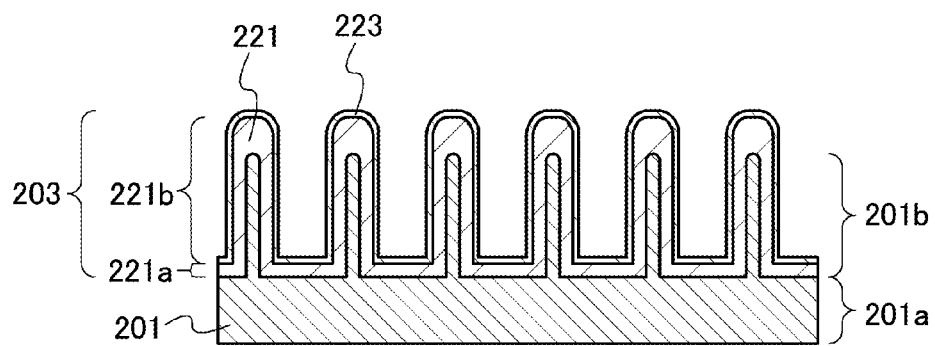

POWER STORAGE DEVICE

BACKGROUND OF THE INVENTION

1. Field of the Invention

One embodiment of the disclosed invention relates to a power storage device.

Note that a power storage device in this specification refers to all elements or devices which have a function of storing electric power.

2. Description of the Related Art

In recent years, with an increase of consciousness about environmental engineering, development of power generation devices using a power generation method which poses fewer burdens on the environment (e.g., solar power generation device) than power generation devices using conventional power generation methods has been actively conducted. Along with development of power generation devices, power storage devices have also been developed.

As a power storage device, a secondary battery such as a lithium-ion secondary battery (also called a lithium ion storage battery, a lithium ion battery, or the like) can be given as example (see Patent Document 1). Lithium-ion secondary batteries have high energy density and are widely popular because they are suited for miniaturization.

In a lithium-ion secondary battery, lithium metal oxide is used for a positive electrode and a carbon material such as graphite is used for a negative electrode. As a positive electrode active material of a lithium-ion secondary battery, for example, a positive electrode active material including composite oxide containing at least alkali metal and transition metal can be given.

In a lithium-ion secondary battery, at the time of charging, lithium in a positive electrode material is ionized into a lithium ion and the lithium ion is moved into a carbon material of a negative electrode material through an electrolyte solution. Generally, when the percentage of a material which ions can enter and leave is increased in an active material with the volume of the active material unchanged, the amount of ions capable of entering and leaving the active material is increased, which can lead to an increase in capacity of a battery.

REFERENCE

Patent Document

[Patent Document 1] Japanese Published Patent Application No. 2011-29000

SUMMARY OF THE INVENTION

In order to use a positive electrode active material disclosed in Patent Document 1 for a lithium-ion secondary battery, a conductive additive mixed for improving conductivity and a binder for binding particles of an active material or binding the active material and a current collector to keep an electrode structure are needed. A positive electrode active material layer including a positive electrode active material, a conductive additive, and a binder is provided over a positive electrode current collector, whereby a positive electrode of a lithium-ion secondary battery is manufactured.

However, when a conductive additive and a binder are included in the positive electrode active material layer, the discharge capacity per unit weight of the positive electrode active material layer is decreased. Further, the binder included in the positive electrode active material layer swells as it comes into contact with an electrolyte solution, so that the positive electrode is likely to be deformed and broken.

In view of the foregoing, one object of one embodiment of the disclosed invention is to provide a positive electrode active material layer in which the amounts of a conductive additive and a binder are reduced.

Another object of one embodiment of the disclosed invention is to provide a highly reliable and highly durable power storage device including a positive electrode active material layer in which the amounts of a conductive additive and a binder are reduced.

Another object of one embodiment of the disclosed invention is to obtain a power storage device having high discharge capacity and favorable characteristics.

In one embodiment of the disclosed invention, as a positive electrode active material, $x[Li_2MnO_3]\text{-}(1-x)[LiCo_{1/3}Mn_{1/3}Ni_{1/3}O_2]$, for example, $0.5Li_2MnO_3\text{-}0.5LiCo_{1/3}Mn_{1/3}Ni_{1/3}O_2$ which is a solid solution material obtained by assigning 0.5 to x and, that is, $Li_{1.2}Mn_{0.53}Ni_{0.13}Co_{0.13}O_2$ is used. The positive electrode active material, $x[Li_2MnO_3]\text{-}(1-x)[LiCo_{1/3}Mn_{1/3}Ni_{1/3}O_2]$ has high discharge capacity. Accordingly, a power storage device including $x[Li_2MnO_3]\text{-}(1-x)[LiCo_{1/3}Mn_{1/3}Ni_{1/3}O_2]$ as a positive electrode active material can have high discharge capacity.

However, even when $x[Li_2MnO_3]\text{-}(1-x)[LiCo_{1/3}Mn_{1/3}Ni_{1/3}O_2]$ having high discharge capacity is used as a positive electrode active material, a conductive additive for improving conductivity and a binder for binding particles of an active material or binding the active material and a current collector to keep an electrode structure are needed in addition to the positive electrode active material, $x[Li_2MnO_3]\text{-}(1-x)[LiCo_{1/3}Mn_{1/3}Ni_{1/3}O_2]$ in order to form a positive electrode active material layer.

As described above, when a conductive additive and a binder are included in the positive electrode active material layer, the discharge capacity per unit weight of the positive electrode active material layer is decreased. Further, the binder included in the positive electrode active material layer swells as it comes into contact with an electrolyte solution, so that the positive electrode is likely to be deformed and broken.

Therefore, as described below, in order to form a positive electrode active material layer, multilayer graphene including a plurality of graphene layers is used. Thus, the amounts of a conductive additive and a binder can be reduced.

Graphene is a lateral layer in graphite, i.e., a carbon layer in which six-membered rings each composed of carbon atoms are connected in the planar direction, and in this specification, a stack of two or more and 100 or less carbon layers is referred to as multilayer graphene. Graphene is chemically stable and has favorable electric characteristics.

Graphene has high conductivity because six-membered rings each composed of carbon atoms are connected in the planar direction. That is, graphene has high conductivity in the planar direction. Graphene has a sheet-like shape and a gap is provided between stacked graphene layers in a direction parallel to the plane, so that ions can transfer in the gap. However, the transfer of ions in the direction perpendicular to the graphene layers is difficult.

Note that in this specification, graphene refers to a one-atom-thick sheet of carbon molecules having $sp^2$ bonds. Further, graphene is flexible. The sheet-like shape of graphene is a given shape such as a rectangular shape or a circular shape.

The multilayer graphene includes two or more and 100 or less graphene layers. The graphene layers are stacked in parallel with a surface of a substrate. The concentration of oxygen contained in the multilayer graphene is 3 atomic % to 10 atomic % inclusive. Further, the multilayer graphene has a sheet-like shape or net-like shape.

In the graphene, the poly-membered ring is formed when a carbon-carbon bond in part of the six-membered ring is broken. The poly-membered ring serves as an opening in the graphene which allows the transfer of ions. Further, in the multilayer graphene, a distance between adjacent graphenes is greater than 0.34 nm and less than or equal to 0.5 nm. Therefore, the transfer of ions between graphenes is easier in the multilayer graphene than in graphite.

The multilayer graphene has a sheet-like shape or a net-like shape. Here, the net-like shape includes a two-dimensional shape and a three-dimensional shape in its category. A plurality of particles of a positive electrode active material are at least partly connected to each other with one multilayer graphene or plural multilayer graphenes. Further, the plurality of particles of the positive electrode active material are at least partly in close contact with and covered with one multilayer graphene or plural multilayer graphenes. In other words, the plurality of particles of the positive electrode active material are at least partly held by one multilayer graphene or plural multilayer grapehenes. Note that, in some cases, the multilayer graphene has a bag-like shape, and the plurality of particles of the positive electrode active material are at least partly held by the bag-like portion. The multilayer graphene at least partly has openings where the particles of the positive electrode active material are exposed in some cases. The multilayer graphene can prevent dispersion of the particles of the positive electrode active material or collapse of the positive electrode active material layer; therefore, the multilayer graphene has a function of maintaining the bond between the particles of the positive electrode active material even when the volume of the particles of the positive electrode active material is increased and decreased by charging and discharging.

In the positive electrode active material layer, the plurality of particles of the positive electrode active material are in contact with the multilayer graphene, so that electrons can transfer through the multilayer graphene. In other words, the multilayer graphene has a function of a conductive additive.

Accordingly, when multilayer graphene is included in the positive electrode active material layer, the amounts of a binder and a conductive additive in the positive electrode active material layer can be reduced.

Further, the reduction in the amount of a binder leads to an increase in durability. Thus, a highly reliable and highly durable power storage device can be provided.

Further, since the amounts of a binder and a conductive additive in the positive electrode active material layer can be reduced, the proportion of the particles of the positive electrode active material in the positive electrode active material layer can be increased. Thus, a power storage device having high discharge capacity and favorable characteristics can be obtained.

Note that in one embodiment of the disclosed invention, when multilayer graphene is used not only for a positive electrode active material layer but also for a negative electrode active material layer, an effect similar to the effect obtained in the positive electrode active material layer for which multilayer graphene is used can be obtained. Accordingly, also in the negative electrode active material layer, the amounts of a binder and a conductive additive can be reduced, so that the proportion of the negative electrode active material in the negative electrode active material layer can be increased. Thus, a power storage device having higher reliability, higher durability, higher discharge capacity, and more favorable characteristics can be obtained.

One embodiment of the disclosed invention relates to a power storage device which includes a positive electrode including a positive electrode active material layer and a negative electrode including a negative electrode active material layer. The positive electrode active material layer includes a plurality of particles of $x[Li_2MnO_3]$-$(1-x)$$[LiCo_{1/3}Mn_{1/3}Ni_{1/3}O_2]$ which is a positive electrode active material, and multilayer graphene with which the plurality of particles of the positive electrode active material are at least partly connected to each other. In the multilayer graphene, a plurality of graphenes are stacked in a layered manner. The graphene contains a six-membered ring composed of carbon atoms, a poly-membered ring which is a seven or more-membered ring composed of carbon atoms, and an oxygen atom bonded to one or more of the carbon atoms in the six-membered ring and the poly-membered ring, which is a seven or more-membered ring.

One embodiment of the disclosed invention relates to a power storage device which includes a positive electrode including a positive electrode active material layer and a negative electrode including a negative electrode active material layer. The positive electrode active material layer includes a plurality of particles of $x[Li_2MnO_3]$-$(1-x)$$[LiCo_{1/3}Mn_{1/3}Ni_{1/3}O_2]$ which is a positive electrode active material, and multilayer graphene with which the plurality of particles of the positive electrode active material are at least partly connected to each other. In the multilayer graphene, a plurality of graphenes are stacked in a layered manner. The graphene contains a six-membered ring composed of carbon atoms, a poly-membered ring which is a seven or more-membered ring composed of carbon atoms and one or more oxygen atoms, and an oxygen atom bonded to one or more of the carbon atoms in the six-membered ring and the poly-membered ring, which is a seven or more-membered ring.

One embodiment of the disclosed invention relates to a power storage device which includes a positive electrode including a positive electrode active material layer and a negative electrode including a negative electrode active material layer. The positive electrode active material layer includes a plurality of particles of $x[Li_2MnO_3]$-$(1-x)$$[LiCo_{1/3}Mn_{1/3}Ni_{1/3}O_2]$ which is a positive electrode active material, and multilayer graphene with which the plurality of particles of the positive electrode active material are at least partly connected to each other. In the multilayer graphene, carbon layers are stacked in a layered manner. In the carbon layer, a plurality of six-membered rings each composed of carbon atoms and a plurality of poly-membered rings which are seven or more-membered rings each composed of carbon atoms are connected in the planar direction, and the carbon layer contains an oxygen atom bonded to one or more of the carbon atoms in the six-membered rings and the poly-membered rings, which are seven or more-membered rings.

One embodiment of the disclosed invention relates to a power storage device which includes a positive electrode including a positive electrode active material layer and a negative electrode including a negative electrode active material layer. The positive electrode active material layer includes a plurality of particles of $x[Li_2MnO_3]$-$(1-x)$$[LiCo_{1/3}Mn_{1/3}Ni_{1/3}O_2]$ which is a positive electrode active material, and multilayer graphene with which the plurality of particles of the positive electrode active material are at least partly connected to each other. In the multilayer graphene, carbon layers are stacked in a layered manner. In the carbon layer, a plurality of six-membered rings each composed of carbon atoms and a plurality of poly-membered rings which are seven or more-membered rings each composed of carbon atoms and one or more oxygen atoms are connected in the planar direction, and the carbon layer contains an oxygen atom bonded to one or more of the carbon atoms in the six-membered ring and the poly-membered ring, which is a seven or more-membered ring.

In one embodiment of the disclosed invention, $x[Li_2MnO_3]\text{-}(1-x)[LiCo_{1/3}Mn_{1/3}Ni_{1/3}O_2]$ is $0.5Li_2MnO_3\text{-}0.5LiCo_{1/3}Mn_{1/3}Ni_{1/3}O_2$ which is obtained by assigning 0.5 to x, that is, $Li_{1.2}Mn_{0.53}Ni_{0.13}Co_{0.13}O_2$.

In one embodiment of the disclosed invention, the negative electrode active material layer includes a negative electrode active material and multilayer graphene with which particles of the negative electrode active material are at least partly connected to each other.

According to one embodiment of the disclosed invention, a positive electrode active material layer in which the amounts of a conductive additive and a binder are reduced can be provided.

According to one embodiment of the disclosed invention, a highly reliable and highly durable power storage device including a positive electrode active material layer in which the amounts of a conductive additive and a binder are reduced can be provided.

According to one embodiment of the disclosed invention, a power storage device having high discharge capacity and favorable characteristics can be obtained.

BRIEF DESCRIPTION OF THE DRAWINGS

In the accompanying drawings:
FIGS. 3A to 3E illustrate a negative electrode.

DETAILED DESCRIPTION OF THE INVENTION

Figure 1A:
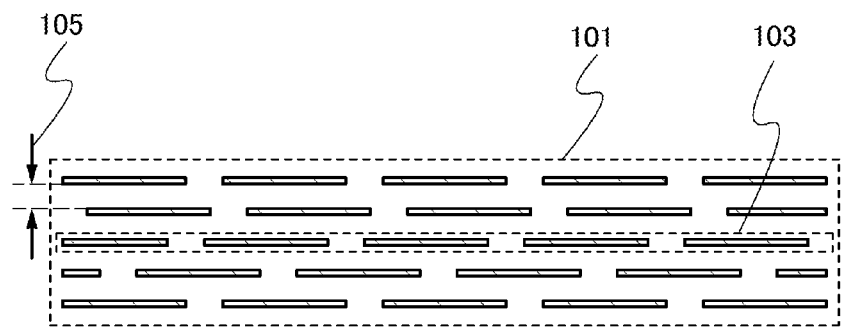
FIGS. 1A to 1C illustrate multilayer graphene.

Embodiment of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiment. Note that, in the drawings hereinafter shown, the same portions or portions having similar functions are denoted by the same reference numerals, and repeated description thereof will be omitted.

Note that the position, size, range, or the like of each structure shown in the drawings and the like is not accurately represented in some cases for easy understanding. Therefore, the disclosed invention is not necessarily limited to the position, size, range, or the like disclosed in the drawings and the like.

In this specification and the like, ordinal numbers such as "first", "second", and "third" are used in order to avoid confusion among components, and the terms do not mean limitation of the number of components.

$<x[Li_2MnO_3]\text{-}(1-x)[LiCo_{1/3}Mn_{1/3}Ni_{1/3}O_2]>$

In this embodiment, as a positive electrode active material, $x[Li_2MnO_3]\text{-}(1-x)[LiCo_{1/3}Mn_{1/3}Ni_{1/3}O_2]$ having high discharge capacity, for example, $0.5Li_2MnO_3\text{-}0.5LiCo_{1/3}Mn_{1/3}Ni_{1/3}O_2$ which is a solid solution material obtained by assigning 0.5 to x, that is, $Li_{1.2}Mn_{0.53}Ni_{0.13}Co_{0.13}O_2$ is used. A method for synthesizing $Li_{1.2}Mn_{0.53}Ni_{0.13}Co_{0.13}O_2$ will be described below.

(a) Mixing of Raw Material

First, lithium carbonate ($Li_2CO_3$), manganese dioxide ($MnO_2$), nickel oxide (NiO), and cobalt oxide ($Co_3O_4$) are used as a source of lithium (Li), a source of manganese (Mn), a source of nickel (Ni), and a source of cobalt (Co), respectively, and weighed so that a predetermined molar ratio is obtained.

The weighed raw materials are ground, mixed, and dispersed with a wet ball mill. The raw materials are ground and mixed and dispersed in such a manner that a ball mill which is made of zirconia and has a ball diameter of 3 mm is rotated at 400 rpm for 2 hours using acetone as a solvent, and thus, a slurry containing a mixture of the raw materials is formed.

(b) Drying and Molding

The acetone is volatilized from the manufactured slurry at 50° C., and drying is performed. Pressure of 14.7 MPa is applied on the mixture of the raw materials which has been subjected to drying, and the mixture of the raw materials is molded into a pellet.

(c) Baking

The molded pellet is put in an alumina crucible and baked in an air atmosphere at a baking temperature of 950° C. for 5 hours.

As an example of a method for forming a positive electrode using the obtained $Li_{1.2}Mn_{0.53}Ni_{0.13}Co_{0.13}O_2$ as a positive electrode active material, the baked pellet is ground and mixed with a conductive additive and a binder. After the mixing, baking is performed again, and a positive electrode active material layer containing the positive electrode active material, the conductive additive, and the binder is obtained.

When a positive electrode including the thus obtained positive electrode active material layer is used, a power storage device with high discharge capacity can be obtained. However, when a conductive additive and a binder are included in the positive electrode active material layer, the discharge capacity per unit weight of the positive electrode active material layer is decreased. Further, the binder included in the positive electrode active material layer swells as it comes into contact with an electrolyte solution, so that the positive electrode is deformed and likely to be broken.

Accordingly, in this embodiment, a plurality of particles of the positive electrode active material are at least partly connected to each other with one multilayer graphene or plural multilayer graphenes. Further, the plurality of particles of the positive electrode active material in this embodiment are at least partly in close contact with and covered with one multilayer graphene or plural multilayer graphenes. In other words, the plurality of particles of the positive electrode active material are at least partly held by one multilayer graphene or plural multilayer graphenes. Note that the multilayer graphene has a bag-like shape, and the plurality of particles of the positive electrode active material are at least partly held by the bag-like portion in some cases. In other words, the multilayer graphene has a function of bonding the plurality of particles of the positive electrode active material.

The multilayer graphene partly has openings where the particles of the positive electrode active material are exposed in some cases. The multilayer graphene can prevent dispersion of the particles of the positive electrode active material or collapse of the positive electrode active material layer; therefore, the multilayer graphene has a function of maintaining the bond between the particles of the positive electrode active material even when the volume of the particles of the positive electrode active material is increased and decreased by charging and discharging.

Thus, the multilayer graphene bonds the plurality of particles of the positive electrode active material; therefore, the amount of a binder in the positive electrode active material layer can be reduced.

Further, the reduction in amount of the binder leads to an increase in durability of a power storage device including the positive electrode active material layer.

In the positive electrode active material layer, the plurality of particles of the positive electrode active material are in contact with the multilayer graphene, so that electrons can transfer through the multilayer graphene. In other words, the multilayer graphene has a function of a conductive additive.

Accordingly, with use of the multilayer graphene, the amount of a conductive additive in the positive electrode active material layer can be reduced.

According to this embodiment, a highly reliable and highly durable power storage device can be provided.

The multilayer graphene, a positive electrode containing the particles of the positive electrode active material which are held by the multilayer graphene, and a power storage device including the positive electrode will be described below.

<Multilayer Graphene>

In this embodiment, a structure of multilayer graphene and a formation method thereof will be described with reference to FIGS. 1A to 1C.

FIG. 1A is a schematic cross-sectional view of multilayer graphene 101. In the multilayer graphene 101, a plurality of graphenes 103 overlap with each other in parallel or in substantially parallel. An interlayer distance 105 between the graphenes 103 in this case is greater than 0.34 nm and less than or equal to 0.5 nm, preferably greater than or equal to 0.38 nm and less than or equal to 0.42 nm, more preferably greater than or equal to 0.39 nm and less than or equal to 0.41 nm. The multilayer graphene 101 includes two or more and 100 or less layers of the graphenes 103.

Figure 1B:
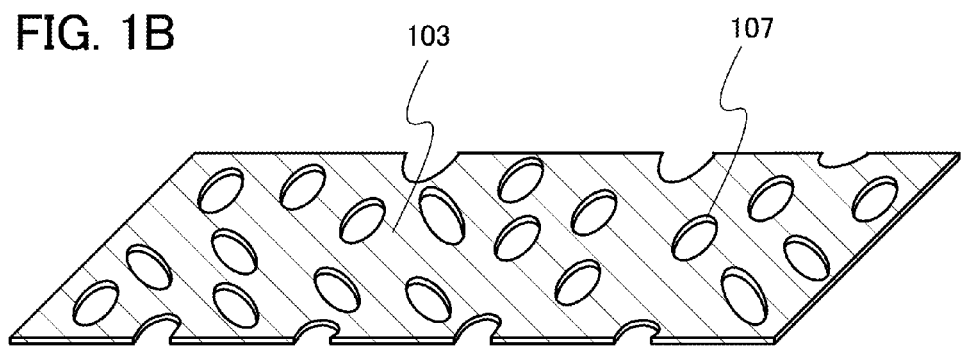

FIG. 1B is a perspective view of the graphene 103 in FIG. 1A. The graphene 103 has a sheet-like shape with a length of several micrometers and partly has openings 107. The openings 107 serve as paths which allow the transfer of ions. Thus, in the multilayer graphene 101 in FIG. 1A, ions can transfer in the direction parallel to a surface of the graphene 103, i.e., between the graphenes 103, and in the direction perpendicular to a surface of the multilayer graphene 101, i.e., through the openings 107 formed in the graphenes 103.

Figure 1C:
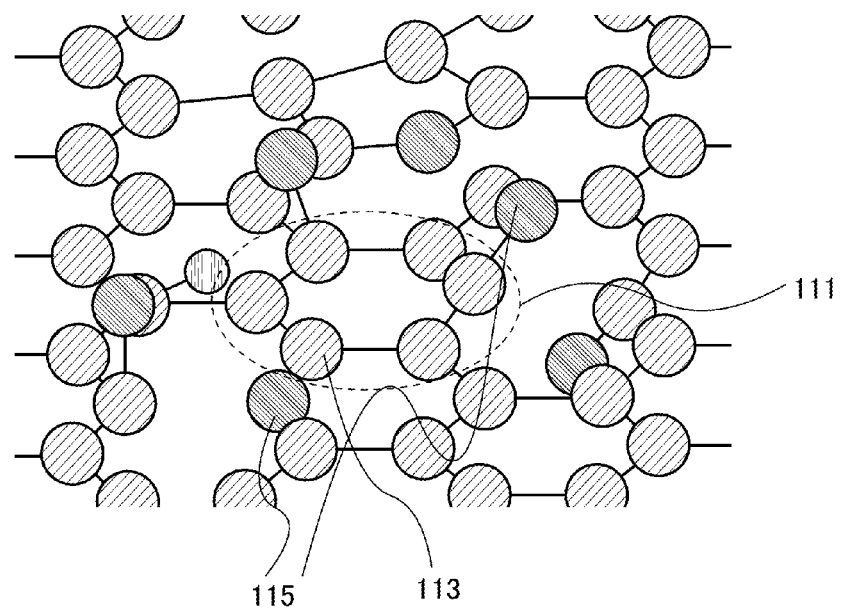

FIG. 1C is a schematic view illustrating molecules in the graphene 103 in FIG. 1B. The graphene 103 contains six-membered rings 111 each composed of carbon atoms 113, which are connected in the planar direction, and poly-membered rings each formed when a carbon bond in part of a six-membered ring is broken, such as a seven-membered ring, an eight-membered ring, a nine-membered ring, and a ten-membered ring. The poly-membered ring corresponds to the opening 107 in FIG. 1B, and a region where the six-membered rings 111 each composed of the carbon atoms 113 are connected corresponds to a hatched region in FIG. 1B. In some cases, the poly-membered rings are composed of only the carbon atoms 113. Further, in some cases, the poly-membered rings are composed of the carbon atoms 113 and oxygen atoms 115. Furthermore, in some cases, in the poly-membered rings, the oxygen atom 115 is bonded to the carbon atom 113.

The concentration of oxygen in the multilayer graphene 101 is 2 atomic % to 11 atomic % inclusive, preferably 3 atomic % to 10 atomic % inclusive. As the proportion of oxygen becomes lower, the conductivity of the multilayer graphene can be higher. As the proportion of oxygen becomes higher, more openings serving as paths of ions can be formed in the graphene.

The interlayer distances between graphenes composing normal graphite are each 0.34 nm and variation of the interlayer distances is small. On the other hand, in the multilayer graphene, one or more oxygen atoms are included in part of six-membered rings each composed of carbon atoms. Further, the multilayer graphene contains a poly-membered ring which is a seven or more-membered ring composed of carbon atoms or carbon atoms and one or more oxygen atoms. That is to say, the multilayer graphene contains oxygen; thus, the interlayer distance between graphenes is longer than the interlayer distance of graphite. The longer interlayer distance facilitates the transfer of ions in the direction parallel to the surface of the graphene, between the graphene layers. In addition, openings formed in the graphene permit ions to easily transfer in a thickness direction of the graphene through the openings.

Note that an alkali metal such as lithium, sodium, or potassium is added to the multilayer graphene, whereby the conductivity can be increased to be greater than or equal to $1 \times 10^5$ S/cm, which is effective when the multilayer graphene is used as a conductive additive in a positive electrode or a negative electrode of a power storage device.

Next, a method for forming multilayer graphene will be described below.

First, a solution containing graphene oxide is formed.

In this embodiment, graphene oxide is formed by an oxidation method called a Hummers method. The Hummers method is as follows. A sulfuric acid solution of potassium permanganate, oxygenated water, or the like is mixed into single crystal graphite powder to cause oxidation reaction; thus, a graphite oxide solution is formed. Graphite oxide contains a functional group such as a carbonyl group, a carboxyl group, or a hydroxyl group due to oxidation of carbon in graphite. Accordingly, the interlayer distance between adjacent graphenes of a plurality of graphenes in graphite oxide is longer than the interlayer distance of graphite. Then, ultrasonic vibration is applied to the graphite oxide solution, so that the graphite oxide whose interlayer distance is long can be cleaved to give graphene oxide. Note that commercial graphene oxide may be used.

In a solution having polarity, different multilayer graphenes are not easily aggregated because oxygen contained in the graphene oxide is negatively charged.

Next, the solution containing graphene oxide is applied to a substrate. As a method of applying the solution containing graphene oxide to the substrate, a coating method, a spin coating method, a dipping method, a spray method, an electrophoresis method, or the like may be employed. Alternatively, these methods may be combined as appropriate to be employed. For example, after the solution containing graphene oxide is applied to a substrate by a dipping method, the substrate is rotated as in a spin coating method, so that the evenness of the thickness of the solution containing graphene oxide can be improved.

Then, part of oxygen is released from the graphene oxide provided over the substrate by reduction treatment. As reduction treatment, the graphene oxide is heated at 150° C. or higher, preferably 200° C. or higher in a vacuum or in a reducing atmosphere such as an inert gas (nitrogen, a rare gas, or the like) atmosphere. By being heated at a higher temperature and for a longer time, graphene oxide is reduced to a higher extent so that multilayer graphene with high purity (i.e., with a low concentration of elements other than carbon) can be obtained.

Since graphite is treated with sulfuric acid according to the Hummers method, a sulfone group and the like are also bonded to the graphite oxide, and its decomposition (release) starts at around 300° C. Therefore, the graphene oxide is preferably reduced at 300° C. or higher.

Through the reduction treatment, adjacent graphenes are bonded to each other to form a huge net-like or sheet-like shape. Further, through the reduction treatment, openings are formed in the graphenes due to the release of oxygen. Furthermore, the graphenes overlap with each other in parallel to a surface of the substrate. Thus, multilayer graphene through which ions can transfer is formed.

Through the above process, highly conductive multilayer graphene through which ions can transfer in the direction parallel to a surface thereof and in the direction perpendicular to the surface thereof can be formed.

In order to hold the plurality of particles of $Li_{1.2}Mn_{0.53}Ni_{0.13}Co_{0.13}O_2$, which is a positive electrode active material, by the multilayer graphene, before the reduction treatment of the graphene oxide, a slurry containing graphene oxide and the particles of $Li_{1.2}Mn_{0.53}Ni_{0.13}Co_{0.13}O_2$ which is a positive electrode active material is formed. Next, the slurry is applied to a substrate or a positive electrode current collector, and then, reduction treatment is performed by heating in a reducing atmosphere, $Li_{1.2}Mn_{0.53}Ni_{0.13}Co_{0.13}O_2$ which is a positive electrode active material is baked, and oxygen in the graphene oxide is released, so that openings are formed in the graphene. Note that oxygen in the graphene oxide is not entirely reduced and partly remains in the graphene. Through the above process, a positive electrode active material layer including multilayer graphene and $Li_{1.2}Mn_{0.53}Ni_{0.13}Co_{0.13}O_2$ which is a positive electrode active material can be formed over the substrate or the positive electrode current collector. Consequently, the positive electrode active material layer has higher conductivity.

As another method for holding a plurality of particles of a positive electrode active material by the manufactured multilayer graphene, a pellet of the baked $Li_{1.2}Mn_{0.53}Ni_{0.13}Co_{0.13}O_2$ which is positive electrode active material is ground and mixed with the manufactured multilayer graphene. After the mixing, baking is performed again, so that a positive electrode active material layer including the multilayer graphene and $Li_{1.2}Mn_{0.53}Ni_{0.13}Co_{0.13}O_2$ which is a positive electrode active material can be obtained.

<Positive Electrode>

Figure 2A:
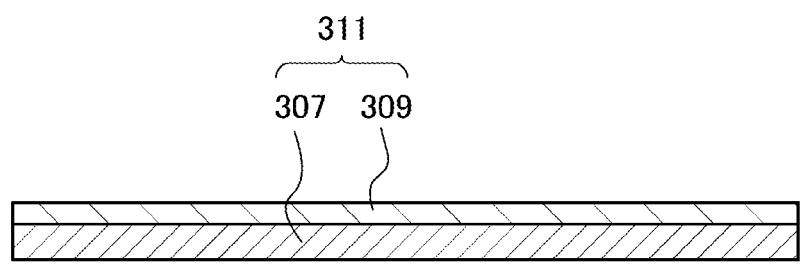
FIGS. 2A to 2C illustrate a positive electrode.

FIG. 2A is a cross-sectional view of a positive electrode 311. In the positive electrode 311, a positive electrode active material layer 309 is formed over a positive electrode current collector 307.

Note that an active material refers to a material that relates to intercalation and deintercalation of ions serving as carriers. Thus, the active material and the active material layer are distinguished.

As the positive electrode current collector 307, a material having high conductivity such as platinum, aluminum, copper, titanium, or stainless steel can be used. The positive electrode current collector 307 can have a foil shape, a plate shape, a net shape, or the like as appropriate.

Figure 2B:
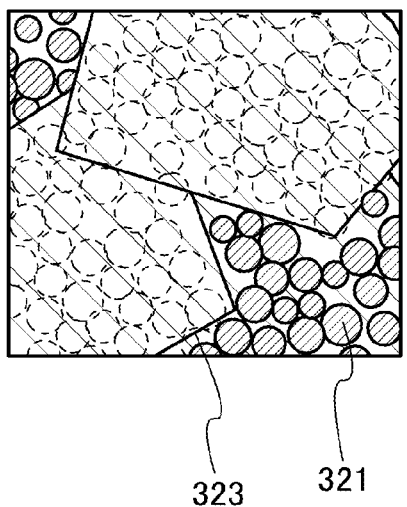

FIG. 2B is a plan view of the positive electrode active material layer 309 including $x[Li_2MnO_3]-(1-x)[LiCo_{1/3}Mn_{1/3}Ni_{1/3}O_2]$ described above, for example, particles of $Li_{1.2}Mn_{0.53}Ni_{0.13}Co_{0.13}O_2$, which is a positive electrode active material 321 capable of occluding and releasing carrier ions, and multilayer graphenes 323 which cover a plurality of particles of the positive electrode active material 321 and at least partly surround the plurality of particles of the positive electrode active material 321. The different multilayer graphenes 323 cover surfaces of the plurality of particles of the positive electrode active material 321. The particles of the positive electrode active material 321 may partly be exposed.

The size of the particle of the positive electrode active material 321 is preferably 20 nm to 100 nm inclusive. Note that the size of the particle of the positive electrode active material 321 is preferably smaller because electrons transfer in the positive electrode active material 321.

Sufficient characteristics can be obtained even when surfaces of the particles of the positive electrode active material 321 are not coated with a carbon film; however, it is preferable to use both the multilayer graphene and the positive electrode active material coated with a carbon film because electrons transfer hopping between the particles of the positive electrode active material.

Figure 2C:
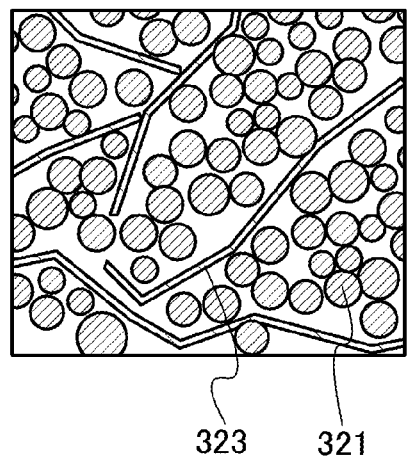

FIG. 2C is a cross-sectional view of part of the positive electrode active material layer 309 in FIG. 2B. The positive electrode active material layer 309 contains the positive electrode active material 321 and the multilayer graphene 323 which cover the particles of the positive electrode active material 321. The multilayer graphene 323 is observed to have a linear shape in cross section. The plurality of particles of the positive electrode active material 321 are at least partly connected to each other with one multilayer graphene or plural multilayer graphenes 323. Further, the plurality of particles of the positive electrode active material 321 are at least partly in close contact with and covered with the multilayer graphene 323. In other words, the plurality of particles of the positive electrode active material 321 are at least partly held by one multilayer graphene 323 or plural multilayer graphenes 323. Note that the multilayer graphene 323 has a bag-like shape, and the plurality of particles of the positive electrode active material 321 are at least partly held in the bag-like portion in some cases. The multilayer graphene 323 partly has openings where the particles of the positive electrode active material 321 are exposed in some cases.

The desired thickness of the positive electrode active material layer 309 is determined in the range of 20 μm to 100 μm. It is preferable to adjust the thickness of the positive electrode active material layer 309 as appropriate so that a crack and separation are not caused.

Note that in this embodiment, the multilayer graphene 323 is used for the positive electrode active material layer 309; therefore, the amounts of a conductive additive and a binder mixed into the positive electrode active material can be reduced. Accordingly, the additive amount of a conductive additive such as acetylene black (AB) particles or carbon nanofibers or the additive amount of a known binder can be reduced.

The volume of the positive electrode active material 321 is expanded by occlusion of ions serving as carriers in some cases. Therefore, the positive electrode active material layer 309 gets vulnerable and is partly collapsed by charging and discharging, resulting in lower reliability of a power storage device. However, the multilayer graphene 323 covering the periphery of the particles of the positive electrode active material 321 allows prevention of dispersion of the particles of the positive electrode active material 321 and the collapse of the positive electrode active material layer 309, even when the volume of the particles of the positive electrode active material 321 is increased. That is to say, the multilayer graphene 323 has a function of maintaining the bond between the particles of the positive electrode active material 321 even when the volume of the particles of the positive electrode active material 321 is increased and decreased by charging and discharging.

The multilayer graphene 323 is in contact with the plurality of the particles of the positive electrode active material 321 and serves also as a conductive additive. Further, the multilayer graphene 323 has a function of holding the particles of the positive electrode active material 321 capable of occluding and releasing carrier ions. Accordingly, the amount of a binder mixed into the positive electrode active material layer 309 can be reduced, so that the proportion of the particles of the positive electrode active material in the positive electrode active material layer 309 can be increased. Thus, the discharge capacity of a power storage device can be increased.

Next, a formation method of the positive electrode active material layer 309 will be described.

Slurry containing graphene oxide and the particles of the positive electrode active material 321 is formed. After the positive electrode current collector 307 is coated with the slurry, heating is performed in a reducing atmosphere for reduction treatment so that the particles of the positive electrode active material 321 are baked and part of oxygen is released from the graphene oxide to form openings in graphene, as in the formation method of the multilayer graphene 323. Note that oxygen in the graphene oxide is not entirely reduced and partly remains in the graphene. Through the above process, the positive electrode active material layer 309 can be formed over the positive electrode current collector 307. Consequently, the positive electrode active material layer 309 has higher conductivity.

Graphene oxide contains oxygen and thus is negatively charged in a polar solvent. As a result of being negatively charged, graphene oxide is dispersed. Accordingly, the particles of the positive electrode active material 321 contained in the slurry are not easily aggregated, so that the size of the particle of the positive electrode active material 321 can be prevented from increasing by baking. Thus, the transfer of electrons in the particles of the positive electrode active material 321 is facilitated, resulting in an increase in conductivity of the positive electrode active material layer 309.

(Negative Electrode)

FIG. 3A is a cross-sectional view of a negative electrode 205. In the negative electrode 205, a negative electrode active material layer 203 is formed over a negative electrode current collector 201.

Note that an active material refers to a material that relates to intercalation and deintercalation of ions serving as carriers. Thus, the active material and the active material layer are distinguished.

As the negative electrode current collector 201, a material having high conductivity such as copper, stainless steel, iron, or nickel can be used. The negative electrode current collector 201 can have a foil shape, a plate shape, a net shape, or the like as appropriate.

The negative electrode active material layer 203 is formed using a negative electrode active material 211 which can occlude and release ions serving as carriers. As typical examples of the negative electrode active material 211, lithium, aluminum, graphite, silicon, tin, and germanium are given. Further, a compound containing one or more of lithium, aluminum, graphite, silicon, tin, and germanium is given. Note that it is possible to omit the negative electrode current collector 201 and use the negative electrode active material layer 203 alone for a negative electrode. The theoretical capacity of germanium, silicon, lithium, and aluminum is higher than that of graphite as the negative electrode active material 211. When the occlusion capacity is high, charge and discharge can be performed sufficiently even in a small area, so that reductions in cost and size of a metal-ion secondary battery typified by a lithium-ion secondary battery can be achieved.

As examples of carrier ions used for metal-ion secondary batteries other than lithium-ion secondary batteries, alkali-metal ions such as sodium ions and potassium ions; alkaline-earth metal ions such as calcium ions, strontium ions, and barium ions; beryllium ions; magnesium ions; and the like are given.

In this embodiment, the negative electrode active material layer 203 may be manufactured in such a manner that a conductive additive and a binder are added to particles of the negative electrode active material 211, and the materials are ground, mixed, and baked.

Further, as another example of a formation method of the negative electrode 205, as in the positive electrode 311, the particles of the negative electrode active material 211 are held by multilayer graphene also in the negative electrode 205, whereby the amounts of a binder and a conductive additive in the negative electrode active material layer 203 can be reduced. An example in which multilayer graphene is used for the negative electrode active material layer 203 will be described below.

FIG. 3B is a plan view of the negative electrode active material layer 203 containing the particles of the negative electrode active material 211 capable of occluding and releasing carrier ions, and multilayer graphenes 213 which cover the plurality of particles of the negative electrode active material 211 and at least partly surround the plurality of particles of the negative electrode active material 211. The different multilayer graphenes 213 cover surfaces of the plurality of particles of the negative electrode active material 211. The particles of the negative electrode active material 211 may partly be exposed.

FIG. 3C is a cross-sectional view of part of the negative electrode active material layer 203 in FIG. 3B. The negative electrode active material layer 203 contains the particles of the negative electrode active material 211 and the multilayer graphenes 213 holding the particles of the negative electrode active material 211. The multilayer graphene 213 is observed to have linear shapes in cross section. The plurality of particles of the negative electrode active material 211 are at least partly surrounded with one multilayer graphene 213 or plural multilayer graphenes 213. In other words, the plurality of particles of the negative electrode active material 211 exist within one multilayer graphene 213 or among plural multilayer graphenes 213. Note that the multilayer graphene 213 has a bag-like shape, and the plurality of particles of the negative electrode active material 211 are at least partly surrounded with the bag-like portion in some cases. The multilayer graphene 213 partly has openings where the particles of the negative electrode active material 211 are exposed in some cases.

The desired thickness of the negative electrode active material layer 203 is determined in the range of 20 μm to 100 μm.

Note that the negative electrode active material layer 203 may contain acetylene black particles having a volume 0.1 to 10 times as large as that of the multilayer graphene, carbon particles having a one-dimensional expansion (e.g., carbon nanofibers), or other known binders.

The negative electrode active material layer 203 may be predoped with lithium. As a predoping method of lithium, a lithium layer may be formed on a surface of the negative electrode active material layer 203 by a sputtering method. Alternatively, lithium foil is provided on the surface of the negative electrode active material layer 203, whereby the negative electrode active material layer 203 can be predoped with lithium.

As an example of the negative electrode active material 211, a material whose volume is expanded by occlusion of ions serving as carriers can be given. Therefore, the negative electrode active material layer 203 gets vulnerable and is partly collapsed by charging and discharging, resulting in lower reliability of a power storage device. However, the multilayer graphene 213 covering the periphery of the particles of the negative electrode active material 211 allows prevention of dispersion of the particles of the negative electrode active material 211 and the collapse of the negative electrode active material layer 203, even when the volume of the particles of the negative electrode active material 211 is increased. In other words, the multilayer graphene 213 has a function of maintaining the bond between the particles of the negative electrode active material 211 even when the volume of the particles of the negative electrode active material 211 is increased and decreased by charging and discharging.

In the case of silicon which is an example of a negative electrode active material, the volume is approximately quadrupled due to occlusion of ions serving as carriers. Therefore, the negative electrode active material 211 gets vulnerable and the negative electrode active material layer 203 is partly collapsed by charging and discharging, resulting in lower reliability of a power storage device. However, the multilayer graphene 213 covering the periphery of the particles of the negative electrode active material 211 allows prevention of the collapse of the negative electrode active material layer 203 due to the increase in volume even when the volume of silicon is increased.

The multilayer graphene 213 is in contact with the plurality of particles of the negative electrode active material 211 and serves also as a conductive additive. Further, the multilayer graphene 213 has a function of holding the particles of the negative electrode active material 211 capable of occluding and releasing carrier ions. Thus, a binder does not necessarily have to be mixed into the negative electrode active material layer 203. Accordingly, the proportion of the particles of the negative electrode active material in the negative electrode active material layer 203 can be increased, which allows an increase in discharge capacity of a power storage device.

Next, a formation method of the negative electrode active material layer 203 in FIGS. 3B and 3C will be described.

Slurry containing the particles of the negative electrode active material and graphene oxide is formed. After the negative electrode current collector 201 is coated with the slurry, heating is performed in a reducing atmosphere for reduction treatment so that the particles of the negative electrode active material 211 are baked and part of oxygen is released from the graphene oxide to form openings in graphene, as in the above formation method of multilayer graphene. Note that oxygen in the graphene oxide is not entirely reduced and partly remains in the graphene. Through the above process, the negative electrode active material layer 203 can be formed over the negative electrode current collector 201.

In FIG. 3D, a structure of the negative electrode 205 including a negative electrode active material 221 having an uneven surface, and multilayer graphene 223 covering a surface of the negative electrode active material 221 is illustrated.

As an example of the negative electrode active material 221 having such an uneven surface, silicon on a surface of which projections are formed by etching or the like can be given. An example of the negative electrode active material 221 having such an uneven surface will be described below.

FIG. 3D is a cross-sectional view of the negative electrode 205 where the negative electrode active material layer 203 is formed over the negative electrode current collector 201. The negative electrode active material layer 203 contains the negative electrode active material 221 having an uneven surface and the multilayer graphene 223 covering a surface of the negative electrode active material 221.

The uneven negative electrode active material 221 includes a common portion 221a and a projected portion 221b extending from the common portion 221a. The projected portion 221b can have a columnar shape such as a cylinder shape or a prism shape, or a needle shape such as a cone shape or a pyramid shape as appropriate. The top of the projected portion may be curved. The negative electrode active material 221 is formed using a negative electrode active material capable of occluding and releasing ions serving as carriers, typically, lithium ions, in a manner similar to that of the negative electrode active material 211. Note that the common portion 221a and the projected portion 221b may be formed using either the same material or different materials.

As described above, silicon can be given as an example of the negative electrode active material 221 in FIG. 3D. The projected portion 221b may be formed by etching of a silicon layer. After the projected portion 221b is formed, the multilayer graphene 223 is formed so as to cover the projected portion 221b and the common portion 221a.

Alternatively, as illustrated in FIG. 3E, the negative electrode active material layer 203 may be formed so as to cover the negative electrode current collector 201 having an uneven surface. In FIG. 3E, the negative electrode current collector 201 includes a common portion 201a and a projected portion 201b extending from the common portion 201a. The projected portion 201b can have a columnar shape such as a cylinder shape or a prism shape, or a needle shape such as a cone shape or a pyramid shape as appropriate. The top of the projected portion may be curved. The projected portion 201b may be formed in such a manner that a material layer which is to be the negative electrode current collector 201 is subjected to etching.

The negative electrode active material 221 formed so as to cover the negative electrode current collector 201 including the common portion 201a and the projected portion 201b also has the common portion 221a and the projected portion 221b. After the projected portion 221b is formed, the multilayer graphene 223 is formed so as to cover the projected portion 221b and the common portion 221a.

When the surface of the negative electrode active material layer 203 is in contact with an electrolyte, the electrolyte and the negative electrode active material react with each other, so that a film is formed over a surface of the negative electrode. The film is called a solid electrolyte interface (SEI) and considered necessary to relieve the reaction of the electrode and the electrolyte for stabilization. However, when the thickness of the film is increased, carrier ions are less likely to be occluded in the negative electrode, leading to problems such as a reduction in conductivity of carrier ions between the electrode and the electrolyte and a waste of the electrolyte.

The multilayer graphene 213 coating the surface of the negative electrode active material layer 203 can suppress an increase in thickness of the film, so that a decrease in discharge capacity can be suppressed.

<Power Storage Device>

Figure 4:
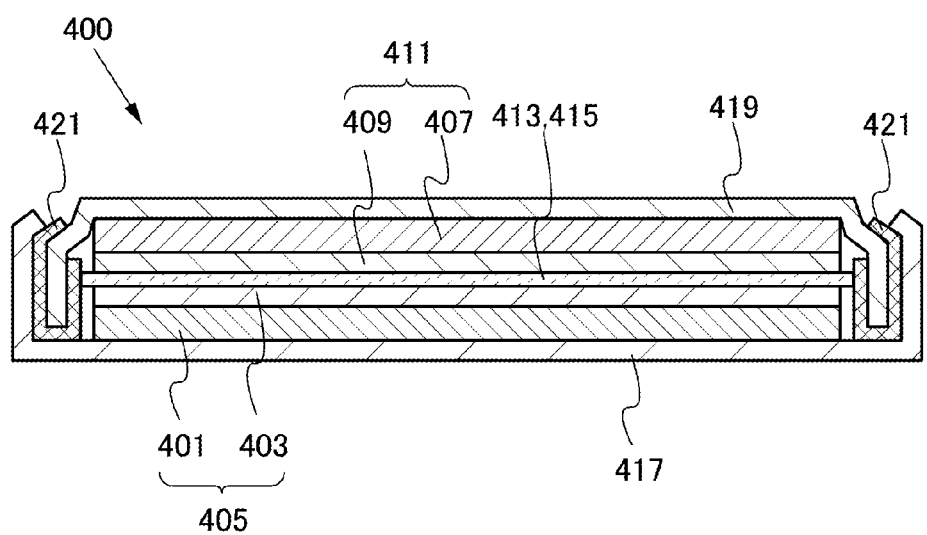
FIG. 4 illustrates a power storage device.

FIG. 4 is a cross-sectional view of a lithium-ion secondary battery.

A lithium-ion secondary battery 400 includes a negative electrode 405 including a negative electrode current collector 401 and a negative electrode active material layer 403, a positive electrode 411 including a positive electrode current collector 407 and a positive electrode active material layer 409, and a separator 413 held by the negative electrode 405 and the positive electrode 411. Note that the separator 413 includes an electrolyte 415. Further, the negative electrode current collector 401 is connected to an external terminal 417, and the positive electrode current collector 407 is connected to an external terminal 419. An end portion of the external terminal 419 is embedded in a gasket 421. In other words, the external terminals 417 and 419 are insulated from each other with the gasket 421.

As the positive electrode current collector 407 and the positive electrode active material layer 409, the positive electrode current collector 307 and the positive electrode active material layer 309 which are described above can be used as appropriate, respectively.

As the negative electrode current collector 401 and the negative electrode active material layer 403, the negative electrode current collector 201 and the negative electrode active material layer 203 which are described above can be used as appropriate, respectively.

As the separator 413, an insulating porous material is used. Typical examples of the separator 413 include cellulose (paper), polyethylene, and polypropylene.

As a solute of the electrolyte 415, a material containing lithium ions, i.e., carrier ions, is used. Typical examples of the solute of the electrolyte include lithium salt such as $LiClO_4$, $LiAsF_6$, $LiBF_4$, $LiPF_6$, and $Li(C_2F_5SO_2)_2N$.

Note that when carrier ions are alkali metal ions other than lithium ions, alkaline-earth metal ions, beryllium ions, or magnesium ions, instead of lithium in the above lithium salts, an alkali metal (e.g., sodium or potassium), an alkaline-earth metal (e.g., calcium, strontium, or barium), beryllium, or magnesium may be used for a solute of the electrolyte 415.

As a solvent of the electrolyte 415, a material in which carrier ions can transfer is used. As the solvent of the electrolyte 415, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled polymer material is used as the solvent of the electrolyte 415, safety against liquid leakage or the like is increased. Further, the lithium-ion secondary battery 400 can be made thinner and more lightweight. Typical examples of a gelled polymer material include a silicon gel, an acrylic gel, an acrylonitrile gel, polyethylene oxide, polypropylene oxide, a fluorine-based polymer, and the like.

As the electrolyte 415, a solid electrolyte such as $Li_3PO_4$ can be used.

For the external terminals 417 and 419, a metal member such as a stainless steel plate or an aluminum plate can be used as appropriate.

Note that in this embodiment, a coin-type lithium-ion secondary battery is given as the lithium-ion secondary battery 400; however, any of lithium-ion secondary batteries with various shapes, such as a sealing-type lithium-ion secondary battery, a cylindrical lithium-ion secondary battery, and a square-type lithium-ion secondary battery, can be used. Further, a structure in which a plurality of positive electrodes, a plurality of negative electrodes, and a plurality of separators are stacked or rolled may be employed.

A lithium-ion secondary battery has a small memory effect, a high energy density, a large capacity, and a high output voltage. Thus, the size and weight of the lithium-ion secondary battery can be reduced. Further, the lithium-ion secondary battery does not easily degrade due to repetitive charge and discharge and can be used for a long time, so that cost can be reduced.

Next, a method for manufacturing the lithium-ion secondary battery 400 described in this embodiment will be described.

By the above manufacturing method, the positive electrode 411 and the negative electrode 405 are manufactured.

Next, the positive electrode 411, the separator 413, and the negative electrode 405 are impregnated with the electrolyte 415. Then, the negative electrode 405, the separator 413, the gasket 421, the positive electrode 411, and the external terminal 419 are stacked in this order over the external terminal 417, and the external terminal 417 and the external terminal 419 are crimped to each other with a "coin cell crimper". Thus, the coin-type lithium-ion secondary battery can be manufactured.

Note that a spacer and a washer may be provided between the external terminal 417 and the negative electrode 405 or between the external terminal 419 and the positive electrode 411 so that the connection between the external terminal 417 and the negative electrode 405 or between the external terminal 419 and the positive electrode 411 is enhanced.

<Electric Appliance>

A power storage device according to one embodiment of the disclosed invention can be used as a power supply of various electric appliances which are driven by electric power.

Specific examples of electric appliances using the power storage device according to one embodiment of the disclosed invention are as follows: display devices, lighting devices, desktop personal computers or laptop personal computers, image reproduction devices which reproduce a still image or a moving image stored in a recording medium such as a digital versatile disc (DVD), mobile phones, portable game machines, portable information terminals, e-book readers, cameras such as video cameras and digital still cameras, high-frequency heating apparatus such as microwaves, electric rice cookers, electric washing machines, air-conditioning systems such as air conditioners, electric refrigerators, electric freezers, electric refrigerator-freezers, freezers for preserving DNA, and dialysis devices. In addition, moving objects driven by an electric motor using electric power from a power storage device are also included in the category of electric appliances. As examples of the moving objects, electric vehicles, hybrid vehicles which include both an internal-combustion engine and a motor, motorized bicycles including motor-assisted bicycles, and the like can be given.

In the electric appliances, the power storage device according to one embodiment of the disclosed invention can be used as a power storage device for supplying enough power for almost the whole power consumption (referred to as a main power supply). Alternatively, in the electric appliances, the power storage device according to one embodiment of the disclosed invention can be used as a power storage device which can supply power to the electric appliances when the supply of power from the main power supply or a commercial power supply is stopped (such a power storage device is referred to as an uninterruptible power supply). Further alternatively, in the electric appliances, the power storage device according to one embodiment of the disclosed invention can be used as a power storage device for supplying power to the electric appliances at the same time as the power supply from the main power supply or a commercial power supply (such a power storage device is referred to as an auxiliary power supply).

Figure 5:
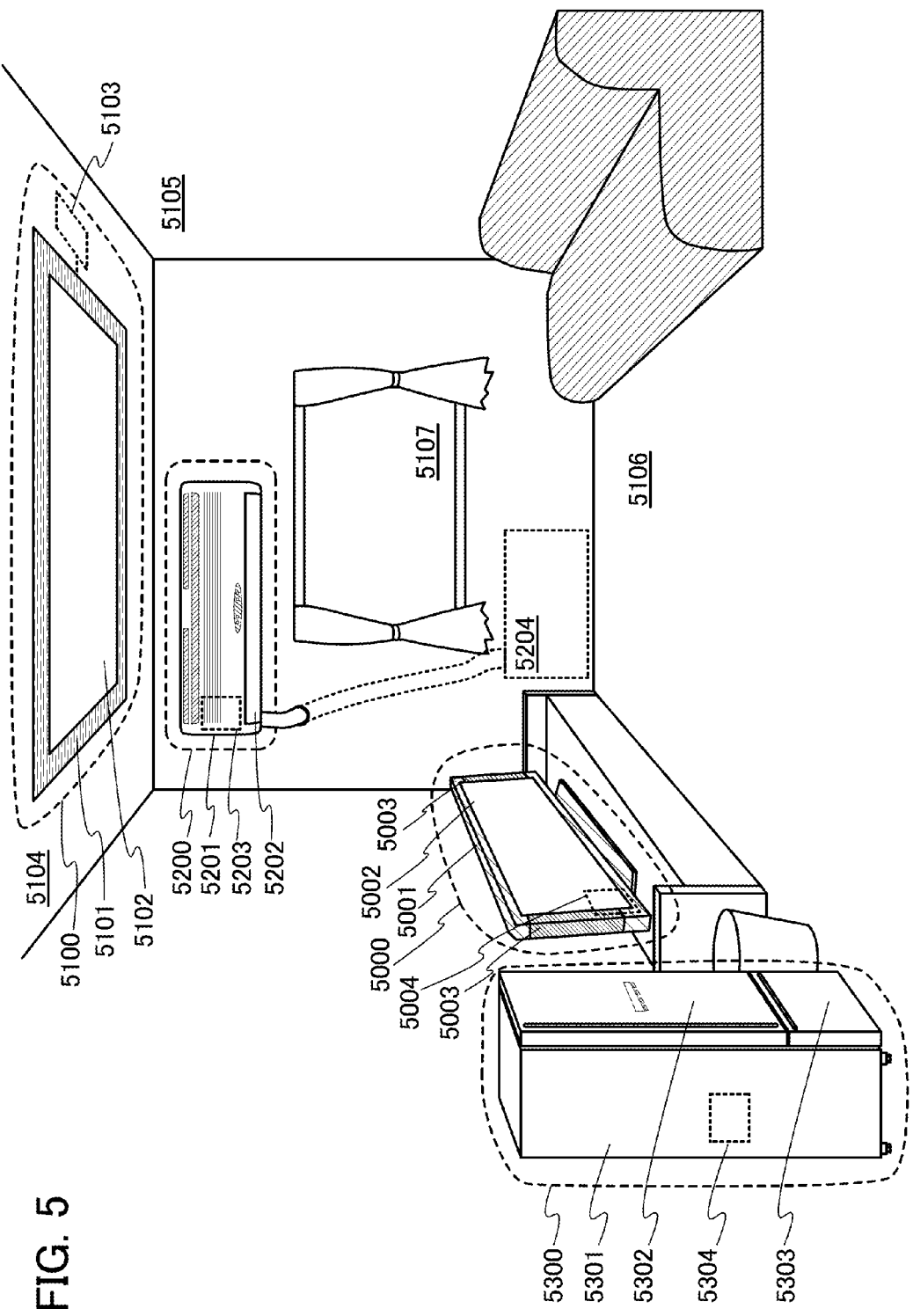
FIG. 5 illustrates electric appliances.

FIG. 5 illustrates specific structures of the electric appliances. In FIG. 5, a display device 5000 is an example of an electric appliance including a power storage device 5004 according to one embodiment of the disclosed invention. Specifically, the display device 5000 corresponds to a display device for TV broadcast reception and includes a housing 5001, a display portion 5002, speaker portions 5003, the power storage device 5004, and the like. The power storage device 5004 according to one embodiment of the disclosed invention is provided inside the housing 5001. The display device 5000 can receive power from a commercial power supply. Alternatively, the display device 5000 can use power stored in the power storage device 5004. Thus, the display device 5000 can be operated with the use of the power storage device 5004 according to one embodiment of the disclosed invention as an uninterruptible power supply even when power cannot be supplied from the commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, all of information display devices for personal computers, advertisement displays, and the like other than TV broadcast reception.

In FIG. 5, an installation lighting device 5100 is an example of an electric appliance including a power storage device 5103 according to one embodiment of the disclosed invention. Specifically, the installation lighting device 5100 includes a housing 5101, a light source 5102, the power storage device 5103, and the like. FIG. 5 shows the case where the power storage device 5103 is provided in a ceiling 5104 on which the housing 5101 and the light source 5102 are installed; alternatively, the power storage device 5103 may be provided in the housing 5101. The installation lighting device 5100 can receive power from a commercial power supply. Alternatively, the installation lighting device 5100 can use power stored in the power storage device 5103. Thus, the installation lighting device 5100 can be operated with the use of the power storage device 5103 according to one embodiment of the disclosed invention as an uninterruptible power supply even when power cannot be supplied from a commercial power supply due to power failure or the like.

Note that although the installation lighting device 5100 provided in the ceiling 5104 is illustrated in FIG. 5 as an example, the power storage device according to one embodiment of the disclosed invention can be used in an installation lighting device provided in, for example, a wall 5105, a floor 5106, a window 5107, or the like other than the ceiling 5104. Alternatively, the power storage device can be used in a tabletop lighting device and the like.

As the light source 5102, an artificial light source which provides light artificially by using electric power can be used. Specifically, an incandescent lamp, a discharge lamp such as a fluorescent lamp, and light-emitting elements such as an LED and an organic EL element are given as examples of the artificial light source.

In FIG. 5, an air conditioner including an indoor unit 5200 and an outdoor unit 5204 is an example of an electric appliance including a power storage device 5203 according to one embodiment of the disclosed invention. Specifically, the indoor unit 5200 includes a housing 5201, an air outlet 5202, the power storage device 5203, and the like. FIG. 5 shows the case where the power storage device 5203 is provided in the indoor unit 5200; alternatively, the power storage device 5203 may be provided in the outdoor unit 5204. Further alternatively, the power storage devices 5203 may be provided in both the indoor unit 5200 and the outdoor unit 5204. The air conditioner can receive power from a commercial power supply. Alternatively, the air conditioner can use power stored in the power storage device 5203. Particularly in the case where the power storage devices 5203 are provided in both the indoor unit 5200 and the outdoor unit 5204, the air conditioner can be operated with the use of the power storage device 5203 according to one embodiment of the disclosed invention as an uninterruptible power supply even when power cannot be supplied from a commercial power supply due to power failure or the like.

Note that although the separated air conditioner including the indoor unit and the outdoor unit is illustrated in FIG. 5 as an example, the power storage device according to one embodiment of the disclosed invention can be used in an air conditioner in which the functions of an indoor unit and an outdoor unit are integrated in one housing.

In FIG. 5, an electric refrigerator-freezer 5300 is an example of an electric appliance including a power storage device 5304 according to one embodiment of the disclosed invention. Specifically, the electric refrigerator-freezer 5300 includes a housing 5301, a door for a refrigerator 5302, a door for a freezer 5303, the power storage device 5304, and the like. The power storage device 5304 is provided in the housing 5301 in FIG. 5. Alternatively, the electric refrigerator-freezer 5300 can receive power from a commercial power supply or can use power stored in the power storage device 5304. Thus, the electric refrigerator-freezer 5300 can be operated with the use of the power storage device 5304 according to one embodiment of the disclosed invention as an uninterruptible power supply even when power cannot be supplied from a commercial power supply due to power failure or the like.

Note that among the electric appliances described above, a high-frequency heating apparatus such as a microwave and an electric appliance such as an electric rice cooker require high power in a short time. The tripping of a circuit breaker of a commercial power supply in use of electric appliances can be prevented by using the power storage device according to one embodiment of the disclosed invention as an auxiliary power supply for supplying power which cannot be supplied enough by a commercial power supply.

In addition, in a time period when electric appliances are not used, specifically when the proportion of the amount of power which is actually used to the total amount of power which can be supplied by a commercial power supply source (such a proportion referred to as usage rate of power) is low, power can be stored in the power storage device, whereby the usage rate of power can be reduced in a time period when the electric appliances are used. In the case of the electric refrigerator-freezer 5300, power can be stored in the power storage device 5304 at night time when the temperature is low and the door for a refrigerator 5302 and the door for a freezer 5303 are not opened and closed. The power storage device 5304 is used as an auxiliary power supply in daytime when the temperature is high and the door for a refrigerator 5302 and the door for a freezer 5303 are opened and closed; thus, the usage rate of power in daytime can be reduced.

As described above, according to this embodiment, a positive electrode active material layer in which the amounts of a conductive additive and a binder are reduced can be obtained.

Further, according to this embodiment, a highly reliable and highly durable power storage device including a positive electrode active material layer in which the amounts of a conductive additive and a binder are reduced can be provided.

Furthermore, according to this embodiment, a power storage device having high discharge capacity and favorable characteristics can be obtained.

This application is based on Japanese Patent Application serial no. 2011-223327 filed with Japan Patent Office on Oct. 7, 2011, the entire contents of which are hereby incorporated by reference.

What is claimed is:

1. A positive electrode comprising:
a first particle comprising an active material and a second particle comprising the active material; and
a first multilayer graphene bonded to the first particle and the second particle,
wherein the first multilayer graphene has oxygen at a concentration of 3 atomic % to 10 atomic %,
wherein in the first multilayer graphene, a plurality of graphenes are stacked in a layered manner, and
wherein the active material comprises a solid solution material of a first component represented by $Li_2MnO_3$ and a second component represented by lithium metal oxide.

2. The positive electrode according to claim 1, wherein the lithium metal oxide is $LiCo_{1/3}Mn_{1/3}Ni_{1/3}O_2$.

3. The positive electrode according to claim 1, wherein the solid solution material is $Li_{1.2}Mn_{0.53}Ni_{0.13}Co_{0.13}O_2$.

4. The positive electrode according to claim 1, wherein the plurality of graphenes each comprise a six-membered ring composed of carbon atoms, a poly-membered ring which is a seven or more-membered ring composed of carbon atoms, and an oxygen atom bonded to one or more of the carbon atoms in the six-membered ring and the poly-membered ring.

5. The positive electrode according to claim 1, wherein at least parts of the first particle and the second particle are connected to each other by the first multilayer graphene.

6. The positive electrode according to claim 1, further comprising a second multilayer graphene,
wherein the first multilayer graphene and the second multilayer graphene are bonded to each other to form a net-like shape.

7. The positive electrode according to claim 1, wherein the first multilayer graphene has a bag-like shape, and
wherein parts of the first particle and the second particle are at least partly held by the bag-like shape.

8. The positive electrode according to claim 1, wherein the first multilayer graphene at least partly has openings.

9. The positive electrode according to claim 1, further comprising a binder and a conductive additive.

10. A power storage device comprising the positive electrode according to claim 1.

11. An electric appliance comprising the power storage device according to claim 10.

12. A positive electrode comprising:
a first particle comprising an active material and a second particle comprising the active material; and
a first multilayer graphene bonded to the first particle and the second particle,
wherein the first multilayer graphene has oxygen at a concentration of 3 atomic % to 10 atomic %,
wherein in the first multilayer graphene, a plurality of graphenes are stacked in a layered manner, and
wherein the active material comprises a solid solution material of a first component represented by $Li_2MnO_3$ and a second component.

13. The positive electrode according to claim 12, wherein the second component is lithium metal oxide except for $Li_2MnO_3$.

14. The positive electrode according to claim 13, wherein the lithium metal oxide is $LiCo_{1/3}Mn_{1/3}Ni_{1/3}O_2$.

15. The positive electrode according to claim 12, wherein the plurality of graphenes each comprise a six-membered ring composed of carbon atoms, a poly-membered ring which is a seven or more-membered ring composed of carbon atoms, and an oxygen atom bonded to one or more of the carbon atoms in the six-membered ring and the poly-membered ring.

16. The positive electrode according to claim 12, wherein at least parts of the first particle and the second particle are connected to each other by the first multilayer graphene.

17. The positive electrode according to claim 12, further comprising a second multilayer graphene,
wherein the first multilayer graphene and the second multilayer graphene are bonded to each other to form a net-like shape.

18. The positive electrode according to claim 12, further comprising a binder and a conductive additive.

19. A power storage device comprising the positive electrode according to claim 12.

20. An electric appliance comprising the power storage device according to claim 19.

* * * * *